United States Patent [19]
Samad

[11] Patent Number: 5,847,952
[45] Date of Patent: *Dec. 8, 1998

[54] NONLINEAR-APPROXIMATOR-BASED AUTOMATIC TUNER

[75] Inventor: Tariq Samad, Minneapolis, Minn.

[73] Assignee: Honeywell Inc., Minneapolis, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 671,996

[22] Filed: Jun. 28, 1996

[51] Int. Cl.$^6$ ................................................ G05B 13/02
[52] U.S. Cl. .................... 364/148; 364/157; 364/158; 364/165
[58] Field of Search .................... 364/148, 157, 364/158, 165; 348/4

[56] References Cited

U.S. PATENT DOCUMENTS

| | | | |
|---|---|---|---|
| 4,677,466 | 6/1987 | Lert, Jr. et al. | 348/4 |
| 4,698,745 | 10/1987 | Hiroi et al. | 364/165 |
| 5,111,531 | 5/1992 | Grayson et al. | 395/23 |
| 5,153,807 | 10/1992 | Saito et al. | 364/165 |
| 5,159,547 | 10/1992 | Chand | 364/157 |
| 5,159,660 | 10/1992 | Lu et al. | 395/22 |
| 5,175,678 | 12/1992 | Frerichs et al. | 364/148 |
| 5,283,729 | 2/1994 | Lloyd | 364/157 |
| 5,295,061 | 3/1994 | Katayama et al. | 364/157 |
| 5,311,421 | 5/1994 | Nomura et al. | 364/157 |
| 5,513,098 | 4/1996 | Spall et al. | 364/158 |

FOREIGN PATENT DOCUMENTS

| | | |
|---|---|---|
| 91304997 | 6/1991 | European Pat. Off. . |
| 38 11 086 A | 10/1988 | Germany . |
| 44 33 332 A | 3/1996 | Germany . |

OTHER PUBLICATIONS

Abstract—Japanese patent document JP3118606 (Yokogawa Electric Corp.), May 21, 1991, *Patent Abstracts of Japan*, vol. 15, No. 322 (P–1239).

Abstract—Japanese patent document JP3265902 (Yokogawa Electric Corp.), Nov. 27, 1991, *Patent Abstracts of Japan*, vol. 16, No. 75 (P–1316).

Abstract—Japanese patent document JP3201008 (Toshiba Corp.), Sep. 2, 1991, *Patent Abstracts of Japan*, vol. 15, No. 469 (P–1281).

(List continued on next page.)

*Primary Examiner*—Thomas C. Lee
*Assistant Examiner*—McDieunel Marc
*Attorney, Agent, or Firm*—John G. Shudy, Jr.

[57] ABSTRACT

An automatic tuner for control systems that produces, as output values, parameters of an arbitrary controller. The controller is in a control loop so that its output effects changes in actuators and regulates a physical process. The controller has either linear or nonlinear controller components, or a combination of both. The tuner has a nonlinear approximator that has been optimized off-line. The off-line optimization is done without supervised learning so that desired outputs of the nonlinear approximator do not need to be available, and separate optimization to generate the desired outputs is not necessary. The off-line optimization can also rely on arbitrary criteria. Such optimization ensures robustness of generated controller parameters so that the input process characteristics do not need to be highly accurate. The inputs to the nonlinear approximator consist of two sets of input parameters, either of which may be empty. A first set of input parameters can relate to process characteristics. A second set of input parameters can relate to desired closed-loop system behavior. The output values may be proportional and/or integral and/or derivative gains for PID-like controllers, or otherwise be parameters for delay-compensation controllers, controllers that consist of lead-lag terms in combination with PID controllers, higher-order linear controllers, or nonlinear controllers of predetermined structure. The nonlinear approximator may be implemented as a compositional sigmoidal mapping, a multilayer perception structure, a fuzzy logic model, a radial basis function network, a polynomial expansion, or other parametrized nonlinear structure.

27 Claims, 13 Drawing Sheets

OTHER PUBLICATIONS

Abstract—Japanese patent document JP3182902 (Toshiba Corp.), Aug. 8, 1991, *Patent Abstracts of Japan*, vol. 15, No. 435 (P–1272).

John Moody et al., "Fast Learning in Networks of Locally–Tuned Processing Units", 1989 in *Neural Computation 1*, published by Massachusetts Institute of Technology, pp. 281–294.

S. Reynold Chu et al., "Neural Networks for System Identification," Apr. 1990, IEEE 0272–1708/90 0400–0031, IEEE *Control Systems Magazine*, pp. 31–34.

T. Troudet et al., "Design and Evaluation of a Robust Dynamic Neurocontroller for a Multivariable Aircraft Control Problem," 1992, Proceedings of the International Joint Conference on Neural Networks, Baltimore, MD.

Barak A. Perarlmutter, "Learning State Space Trajectories in Recurrent Neural Networks", 1989 in *Neural Computation 1*, published by Massachusetts Institute of Technology, pp. 263–269.

Jeffrey L. Elman, "Finding Structure in Time," Apr. 1988, in *CRL Technical Report 8801*, published by Center for Research in Language, Univ. of California, San Diego.

D.E. Rumelhart et al., "Learning Internal Representations by Error Propagation," 1986, Chapter 8 from *Parallel Distributed Processing*, vol. 1, pp. 318–361.

Allon Guez et al., "Neural Network Architecture for Control," Apr. 1988, IEEE 0272–1708/88 0400–0022, *IEEE Control Systems* Magazine, pp. 22–25.

Neuralware News Release, "Neuralware Announces High–Performance Product for Process Control Industry," Jul. 8, 1991.

David W. St.Clair, *Controller Tuning and Control Loop Performance, a Primer*, 1989.

Bernard Widrow et al., "Neural Nets for Adaptive Filtering and Adaptive Pattern Recognition," 1988, IEEE, *An Introduction to Neural and Electronic Networks*, pp. 249–271.

Richard P. Lippmann, "An Introduction to Computing with Neural Nets," Apr. 1987, IEEE *ASSP Magazine*, pp. 4–22.

A.E.B. Ruano et al., "A Neural Network Controller," 1991, Copyright by IFAC Algorithms and Architectures for Real–Time Control, Bangor, North Wales, UK, pp. 27–32.

Jerry M. Mendel, "A Survey of Learning Control Systems," Jul. 1966, *ISA Transactions*, vol. 5, No. 3, pp. 297–303.

Roman W. Swiniarski, "Novel Neural Network Based Self–Tuning PID Controller which Uses Pattern Recognition Technique," Jun. 1990, Proceedings of the American Control Conference, pp. 3023–3024.

Roman W. Swiniarski, "Neural Network Based Self–Tuning PID Controller with Fourier Transformation of Temporal Patterns," 1990, IEEE, Proceedings of 16th Annual Conference of IEE Industrial Electronics Society, vol. II, Power Electronics Emerging Technologies, Nov. 27–30, 1990, Pacific Grove, California.

John K. Chaung et al., "Using a Neural Network as a Feedback Controller," 1989, IEEE, Proceedings of Midwest Symposium on Circuits and Systems, Aug. 14–16, 1989, Champaign, Illinois, pp. 752–755.

NONLINEAR-APPROXIMATOR-BASED AUTOMATIC TUNER

BACKGROUND OF THE INVENTION

The present invention pertains to tuners for controllers, and particularly to automatic tuners for controllers. More particularly, the invention pertains to nonlinear-approximator-type of tuners. U.S. Pat. No. 5,311,421, by Masahide Nomura et al., issued May 10, 1994, and entitled "Process Control Method and System for Performing Control of a Controlled System by Use of a Neural Network," provides background information for the present invention and is hereby incorporated by reference in this description.

SUMMARY OF THE INVENTION

The invention is a technique for developing a tuner which is used for tuning or optimally guiding a controller. The tuner has a preprocessor for transforming a set of input signals into a set of normalized parameters. These parameters are inputted to a nonlinear approximator which operates on the set of normalized parameters to result in a set of normalized tuning parameters. The set of normalized tuning parameters goes to a postprocessor which scales this set of parameters into controller tuning parameters which go to the controller. The nonlinear approximator can be based on neural networks or other parametrized nonlinear structures. In essence, determining nonlinear approximator parameters actually amounts to designing or setting-up a tuner. In turn, the tuner tunes the controller having a closed loop, with appropriate controller parameters.

DESCRIPTION OF THE EMBODIMENT

Figure 1:
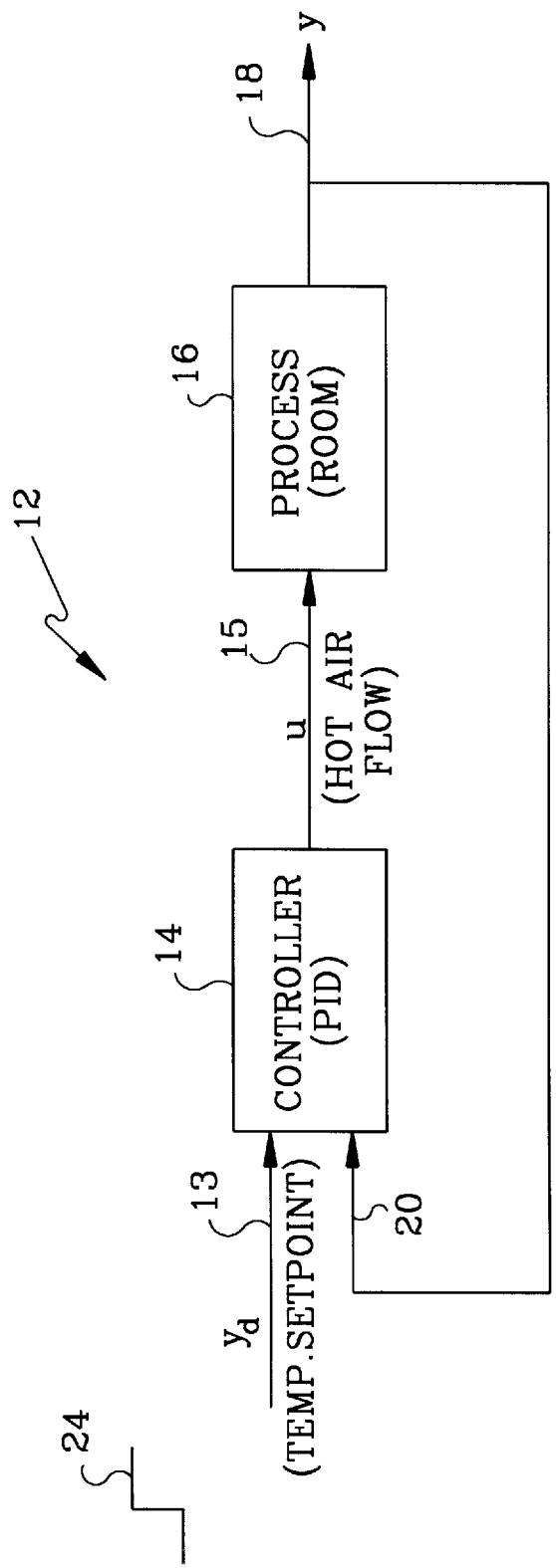
FIG. 1 shows a basic controller and process relationship.

FIG. 1 shows a simple system proportional-integral-derivative (PID) controller 12 that may be used for control of the temperature in a room. The setpoint $y_d$ for temperature is input at line 13 to controller 14 which has a u output on line 15 for controlling an airflow, such as heat or hot air flow, to process 16. The controller output goes to the furnace via a gas valve or other furnace controlling device. Process 16 is the room having its space temperature controlled. An output y on line 18 indicates the temperature of the room. Signal y is fed back to an input 20 of controller 14. In other words, controller 14 looks at the current temperature on line 18 and the setpoint (thermostat) temperature (y desired) on line 13, and uses the difference between the temperatures to calculate heating input 15 to the room or process 16.

"u" can be shown relative to various domains in a simple proportional-integral (PI) controller according to the following equations, where:

$k_c$ is the proportional gain for the controller;
$k_i$ is the integral gain for the controller;
t is time;
$\tau$ is an integration variable;
e(t) is the process output error at time t;
u(t) is the controller output at time t;
y(t) is the process output at time t;
$y_d(t)$ is the desired process output or setpoint of time t;
U(s) is the Laplace transform of u(t);
E(s) is the Laplace transform of e(t);
j is a summation index; and
l is a discrete time index.

$$u(t) = k_c e(t) + k_i \int_{\tau=0}^{\tau=t} e(\tau)d\tau \quad (1)$$

where $e(t) = y_d(t) - y(t)$ $$U(s) = k_c E(s) + \frac{k_i}{s} E(s) \quad (2)$$

$$u(l) = k_c e(l) + k_i \sum_{j=0}^{l} e(j)\Delta t \quad (3)$$

Equation (1) is stated for the continuous-time domain, equation (2) for the Laplace or frequency domain, and equation (3) for the discrete-time domain. The proportional ($k_c$) and integral ($k_i$) gains are set to values appropriate for the application of control system 14 to process 16. $\Delta t$ is the sampling interval.

Figure 2:
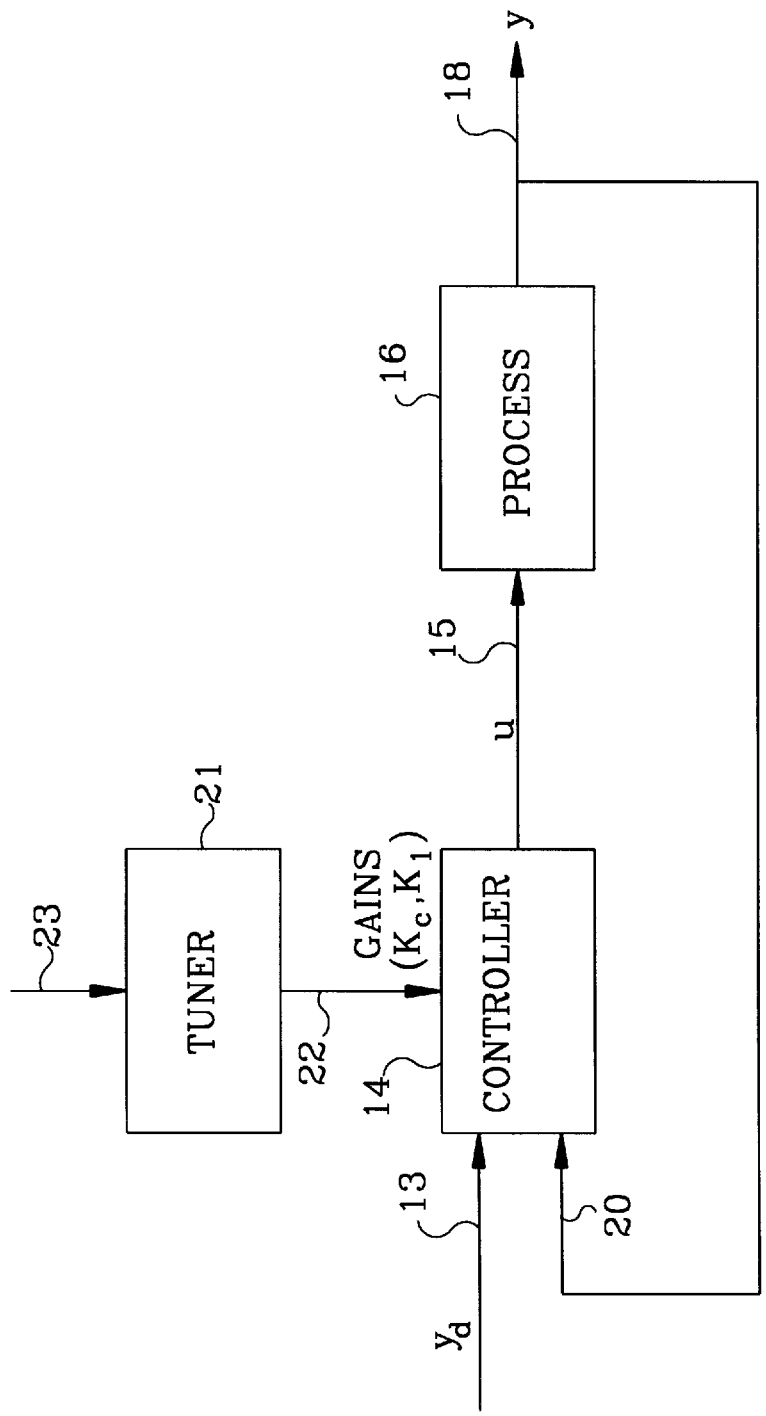
FIG. 2 shows a controller with a tuner, along with a process.

The algorithms, used for setting controller gains, for instance $k_c$ and $k_i$, are called "tuning algorithms." The tuning algorithm is implemented in a tuner 21 of FIG. 2. The tuner puts gains $k_c$ and $k_i$ into controller 14 via line 22. To set these gains is often done by a "trial and error" approach in the related art. Current tuners in the art are not wholly satisfactory.

Inputs to tuner 21 need to indicate two types of information. The first type of information is the relevant dynamics of the process (e.g., characteristics of the room, such as its heat loss, heating-up time constant, and the delay due to ductwork from the furnace to the room). The second type of information is desired dynamics of the closed loop (e.g., time to reach the setpoint, settling time, overshoot, tolerances of overshoot, and importance of reducing control energy).

Figure 3:
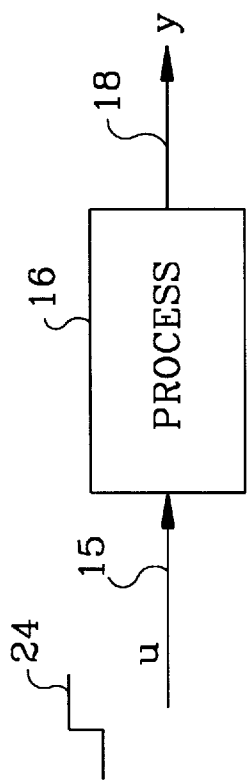
FIG. 3 shows a process with a step-function input.
Figure 4:
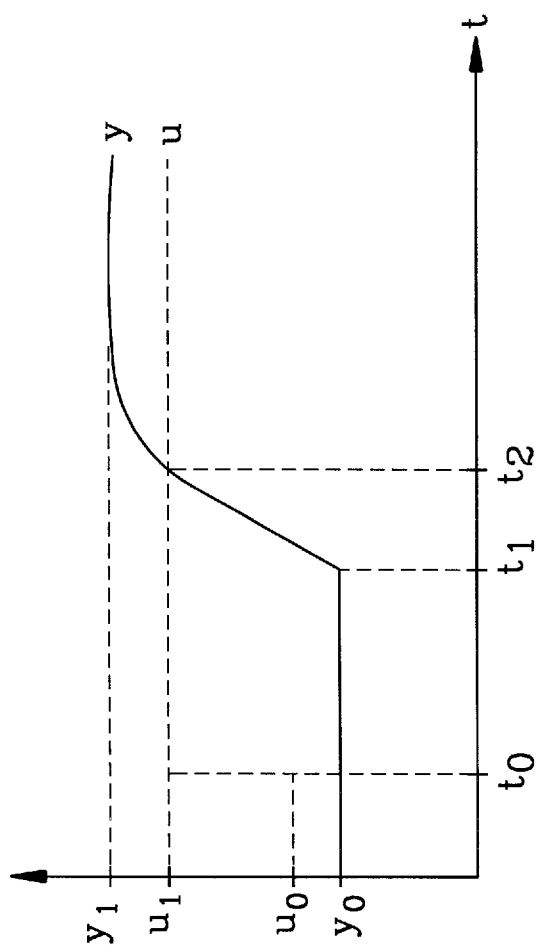
FIG. 4 shows the characteristics of an open loop step response of the process in FIG. 3.

FIG. 3 shows a step function 24 of u to input 15 of process 16 and output y from line 18. FIG. 4 shows the characteristics of an open loop step response of process 16. The process is of a first order with a delay linear system which is usually sufficient for most industrial and building control processes. Such system has three process model parameters $K_p$, $T_p$ and $T_D$.

The gain is $K_p = (y_1 - y_0)/(u_1 - u_0)$.

The time constant, $T_p = t_2 - t_1$, (which is the time that y takes to reach 63 percent of the final output). The dead time or delay is $T_D = t_1 - t_0$. If $K_p$, $T_p$, $T_D$, are changed, then the curve for y will change.

Figure 5:
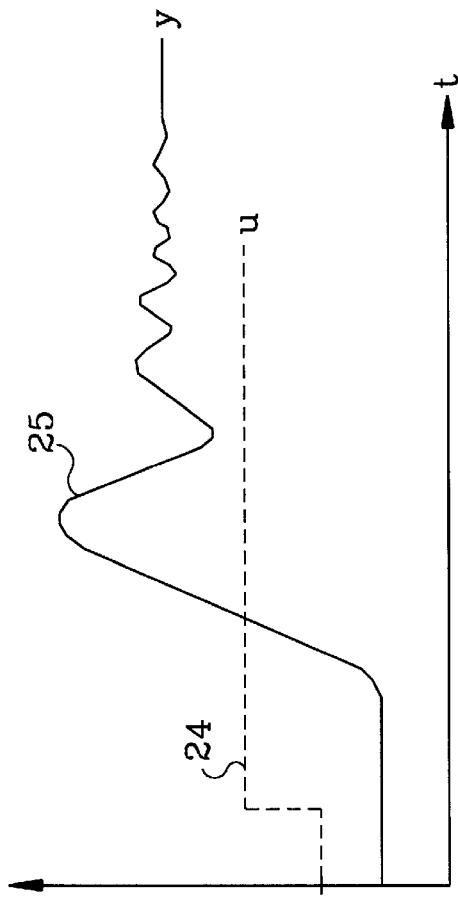
FIG. 5 shows a graph with a step function having a resultant overshoot and an oscillatory settling which has to be modeled as at least a second order system with delay.

FIG. 5 shows a graph with a step function having a resultant overshoot and an oscillatory settling 25 which has to be modeled as at least a second order system with delay, relative to input 24.

Figure 6:
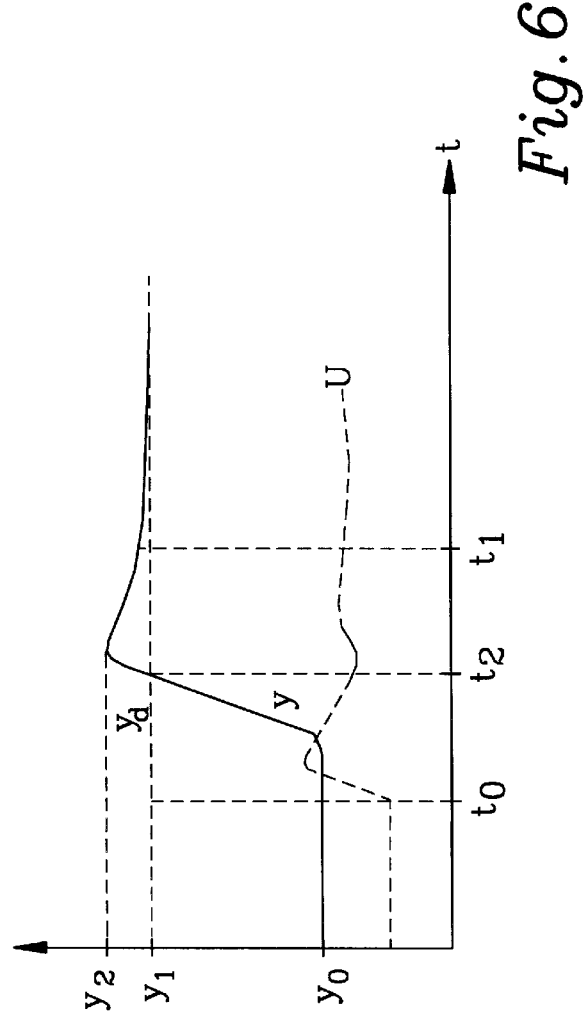
FIG. 6 reveals the closed-loop step response parameters of a system.

FIG. 1 shows a closed-loop system 12 with a step function signal 24 to input 13. FIG. 6 reveals the closed-loop step response parameters of system 12.

Process overshoot is $Y_{cs} = (y_2 - y_1)/(y_1 - y_0)$

Settling time is $t_{ST} = t_1 - t_0$

Rise time is $t_{RT} = t_2 - t_0$

Control energy is $E_c = \sum_{\tau=t_0} (u(\tau) - u(\tau-1))^2$

One important objective in tuning a controller is to manipulate these and other closed-loop response parameters. For example, large overshoots are typically undesirable, but often unavoidable if fast settling times are required (the settling time is the time after the setpoint change after which the process output y is within some quantity, e.g. 95%, of the desired output or setpoint $Y_d$, with the percentage computed relative to the magnitude of the setpoint change). For fast settling, control energies will also typically be high. The response parameters have a complex relationship to each other and to the tuning parameters, and no formulae are available that can accurately characterize this relationship.

Different tuning methods take different types of tuner inputs of the relevant dynamics of the process and desired dynamics of the loop, and provide gains for different types of controllers. The present invention of tuning can be used for any kind of linear or nonlinear controller, not just a PID type. Tuner inputs can be customized as desired, and the tuner can be made robust to whatever extent desired. Robustness is the graceful tolerance of uncertainty of knowledge about the system. It is also the graceful tolerance of change or drift in the system.

Two kinds of parameters are "nominal" and "estimated". For example, $K_p$ is the nominal or actual gain and $\hat{K}_p$ is estimated gain. Controllers are designed to take into consideration that $K_p \neq \hat{K}_p$.

Features of the present invention are the use of one or several nonlinear approximators in the tuner, and the use of a general optimization system. The following types of nonlinear approximators are explicitly considered:

Conventional multilayer perceptron neural networks
Computationally simple, compositional sigmoidal nonlinear mappings
Radial basis function networks
Functional link networks
Cerebellar model articulation controller (CMAC) networks
Fuzzy logic models
Wavelet networks
Polynomial expressions
Specific nonlinear parametrized structures based on human intuition about controller tuning The common aspect of these and other relevant approximator structures is that they implement nonlinear mappings the form of which can be adjusted by manipulating parameters associated with the approximator. Thus generally a nonlinear approximator, as used in this invention, can be expressed as follows:

$$p_c = F(I; p_a)$$

where $p_c$ is the vector of controller tuning parameters, I is the input vector to the nonlinear approximator, and $p_a$ is the parameter vector for the approximator. For example, a conventional multilayer perceptron neural network may implement the mapping F as:

$$p_c[j] = \left(1 + \exp\left[-\sum_{i=1}^{i=h} w_{ij}^0 h_i + b_j^0\right]\right)^{-1}$$

where the $h_i$ are intermediate ("hidden unit") variables computed as:

$$h_i = \left(1 + \exp\left[-\sum_{k=1}^{k=n} w_{ki}^h I_k + b_i^h\right]\right)^{-1}$$

Here the parameter vector pa consists of the input-to-hidden weights $w_{ki}^h$, the hidden-to-output weights $w_{ij}^o$, and the hidden and output bias weights $b_i^h$ and $b_j^o$. i and k are summation indices, j is the element of the approximator output vector, h is the number of hidden units, and n is the number of elements of the input vector I. These expressions relate to "one-hidden-layer" neural networks. Multiple layers of hidden units can also be used.

As another example, a computationally simple, compositional sigmoidal nonlinear mapping may implement F as:

$$p_c[j] = \sum_{i=1}^{i=b} v_{ij} \frac{I \cdot w_i + a_i}{1 + |I \cdot w_i + a_i|}$$

where the parameter vector $p_a$ comprises the vectors $w_i$ and the scalars $a_i$ and $v_{ij}$. i is a summation index and b is the number of nonlinear elements in the structure. The period (.) denotes the dot product operator. Note that this form of the nonlinear approximator, which otherwise resembles a neural network, does not require the use of transcendental functions such as exponentials or hyperbolic tangents which are costly to compute. This approximator is the approach of first choice for this invention. Again, multiple "layers" of the nonlinearities can be used.

As a third example, a radial basis function network may implement the mapping F as:

$$p_c[j] = \sum_{i=1}^{i=N} w_{ij} \exp(\|I - \mu_i\|/\sigma_i^2)$$

where the parameter vector $p_a$ comprises the vectors $\mu_i$ and the scalars $\sigma_i$ and $w_{ij}$. i is a summation index and N is the number of Gaussian nonlinearities in the structure.

As a final example, a polynomial expansion may be used as the nonlinear approximator such as:

$$p_c[j] = \sum_{k=1}^{k=n} a_k I_k + \sum_{k=1}^{k=n} \sum_{l=1}^{l=k} b_{kl} I_k I_l$$

where the parameter vector $p_a$ comprises the scalars $a_k$ and $b_{kl}$ and n is the number of elements in the input vector I. k and l are summation indices.

Figure 7:
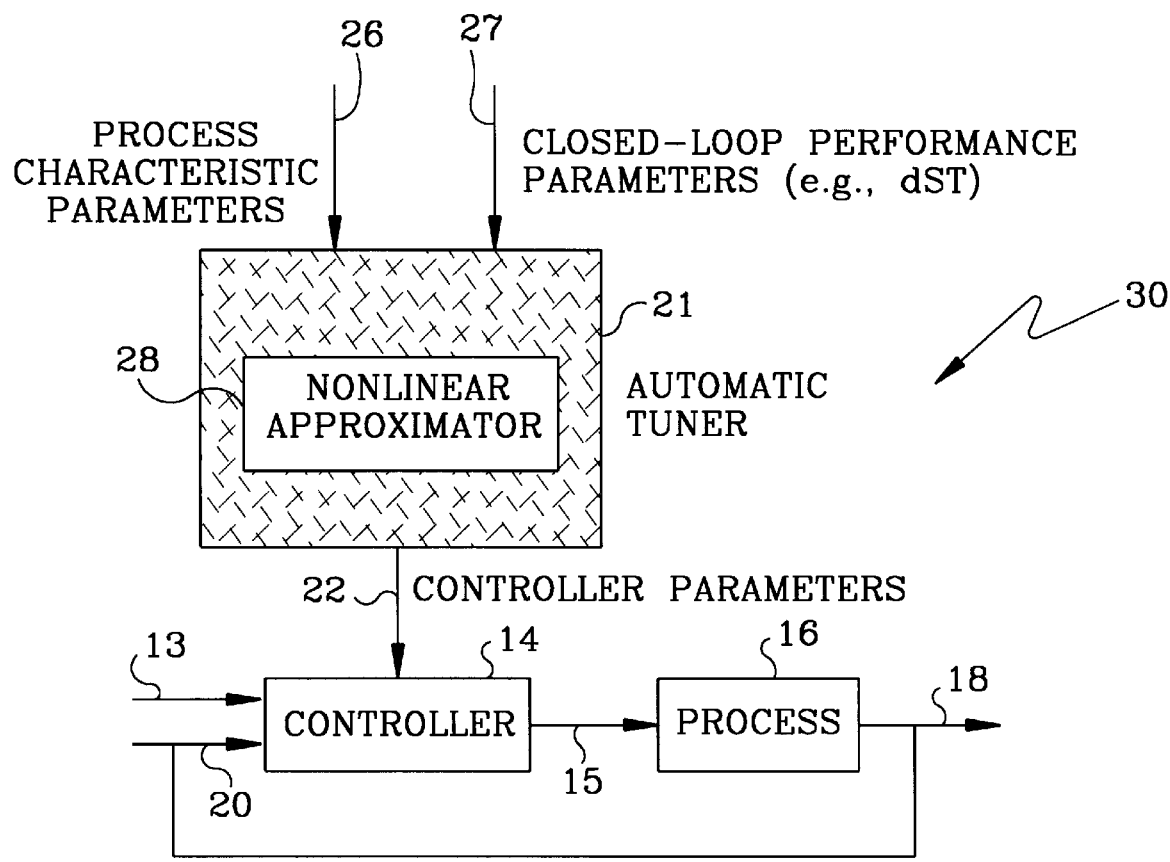
FIG. 7 reveals a tuner with separate inputs for process characteristic parameters and closed-loop performance parameters.

FIG. 7 reveals a controller system 30 which has a nonlinear-approximator-based automatic tuner 21 having separate inputs for process characteristic parameters and closed loop performance parameters. The latter can be used to adjust closed-loop performance for slow or fast settling. Inputs 26 and 27 permit one pre-designed tuner 21 to be used for many applications or be universal for large and various classes of applications. A nonlinear approximator 28 is optimized off-line but without using supervised learning methods. Nonlinear approximator 28 may be a neural network but is not used as a nonlinear regression model (as it is in Nomura et al.—see their FIG. 33).

In addition to neural network or other nonlinear approximator 28, automatic tuner 21 can contain preprocessing and post-processing functions. These include scaling functions which are done outside of the neural network. Scaling is performed mainly for linearity purposes. Process characteristic parameters 26 (notated as $p_p$ later) and closed-loop performance parameters 27 (notated as $p_j$ later) allow one pre-designed automatic tuner 21 to be used for a broad variety of applications. No on-line or application-specific training or optimization of the neural network, or modification of other components of the automatic tuner, are needed.

A specific example is neural-network-based automatic tuner 21 for processes that can be modeled as first-order with dead time linear processes. Such processes can be modeled with three process model (or process characteristic) parameters 26: the process gain, time constant, and dead time. One closed-loop performance parameter is also assumed: a settling time knob $d_{ST}$ (this constitutes the closed loop performance parameter at 27 in FIG. 7), which can be used to adjust closed-loop performance for slow or fast settling. There may be other closed-loop performance parameters on input 27. In this case, the neural network can be off-line optimized without using supervised learning that is used in the related art (as discussed below) using a simulation-based optimization system.

Figure 8:
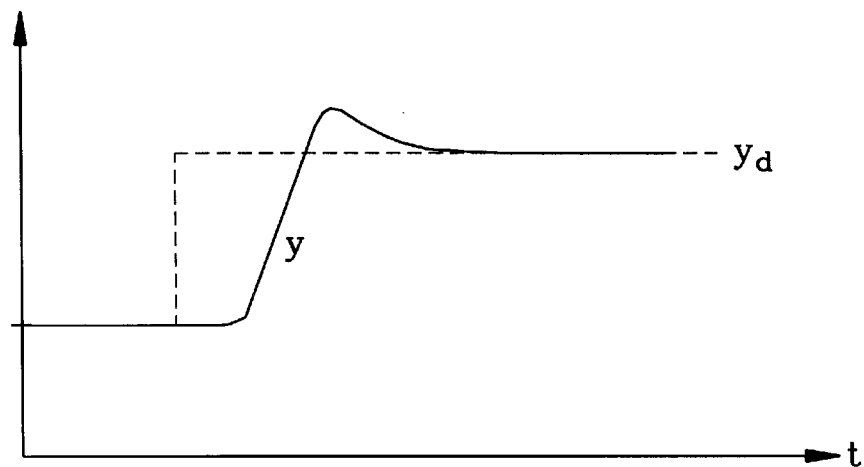
FIG. 8 is a graph of fast settling performance with is overshoot.
Figure 9:
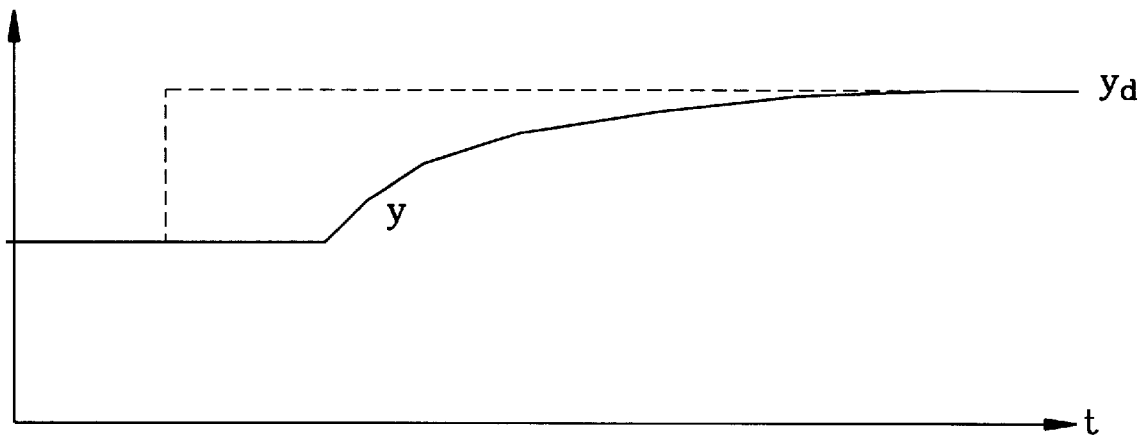
FIG. 9 is a graph of slow settling performance without overshoot.

FIG. 8 shows the fast settling (i.e., low $t_{ST}$) performance with overshoot for a low $d_{ST}$ input 27. FIG. 9 shows the slow settling (i.e., high $t_{ST}$) performance without overshoot for a high $d_{ST}$ input 27. There may be a knob for $d_{ST}$ that provides an analog-like variation, such as from zero to one, to automatic tuner 21.

Figure 10A:
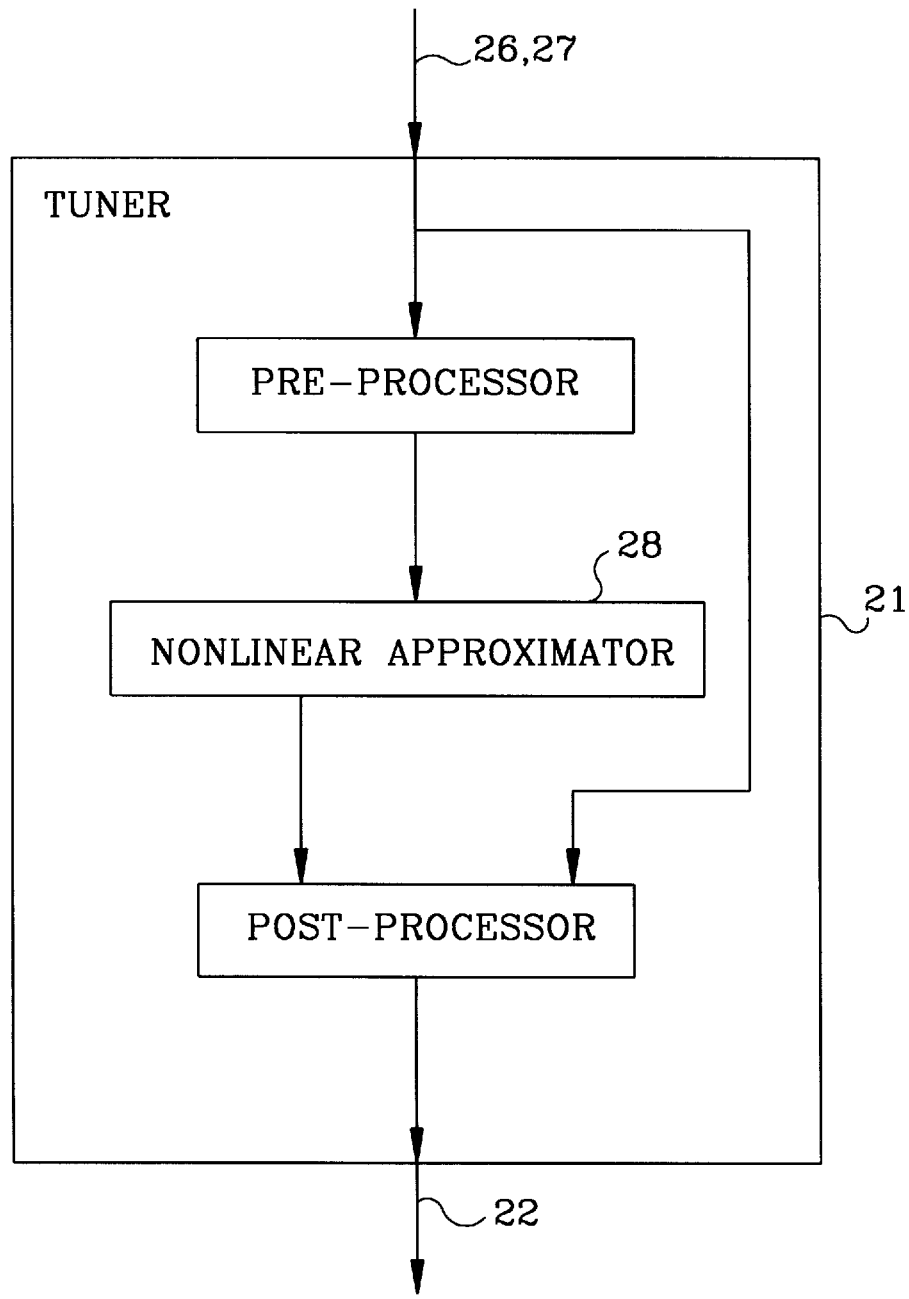
FIGS. 10a and 10b show an automatic tuner for processes that can be modeled as first-order linear systems with delay.
Figure 10B:
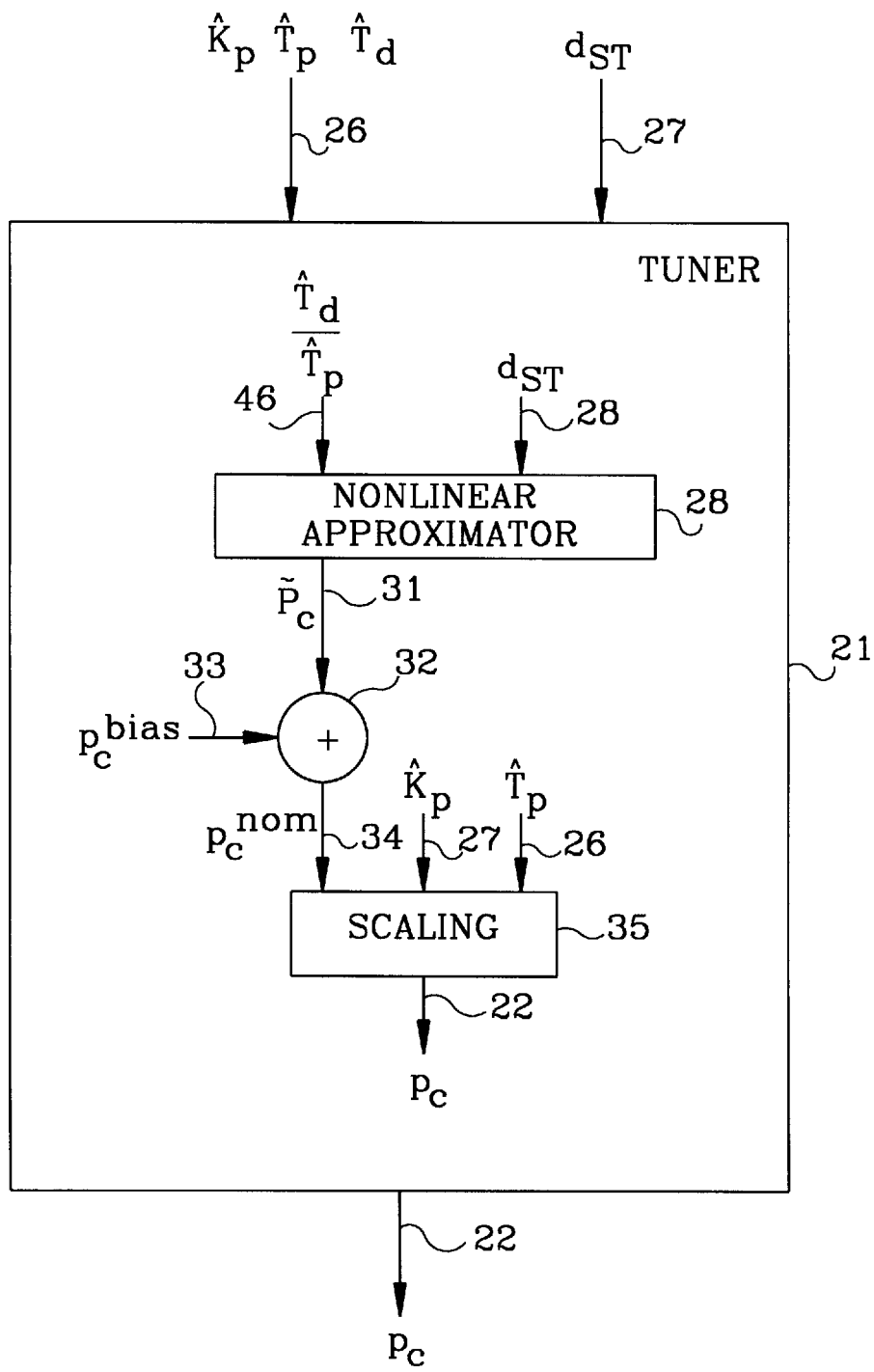

The key feature of the present invention is the design of nonlinear approximator 28. During operation in a setup similar to FIG. 7, automatic tuner 21 can have a basic architecture, with pre-processor, non-linear approximator 28 and post-processor, as shown in figure 10a. Note in figure 10b that three process characteristic parameters are input to automatic tuner 21: estimates of process gain, time constant, and dead time (notated $\hat{K}_p$, $\hat{T}_p$, and $\hat{T}_d$). Output 22 of the tuner 21 consists of controller parameters (for example, for a PID controller, these would be the proportional, integral, and derivative gains) $P_c$. In figure 10b, $P_c^{bias}$ is an internal variable to automatic tuner 21 that consists of baseline controller parameters which are then modified in a context-sensitive way by neural network or a nonlinear approximator 28. Note that by intelligently structuring autotuner 21, the number of inputs required for nonlinear approximator 28 is reduced—in this case, to two. $\hat{T}_d/\hat{T}_p$ to line 46 and $d_{ST}$ to line 29 are inputted to nonlinear approximator 28. An output 31, $\tilde{P}_c$, which is a control parameter, is fed into summing junction 32. A $P_c$ bias is added at line 33 to $\tilde{P}_c$ at summer 32 which outputs a $p_c$nom, which is the vector of nominal (unscaled) control parameters, at line 34 and is inputted to scaling mechanism 35. Output 22 of scaling 35 goes to controller 14.

Figure 11:
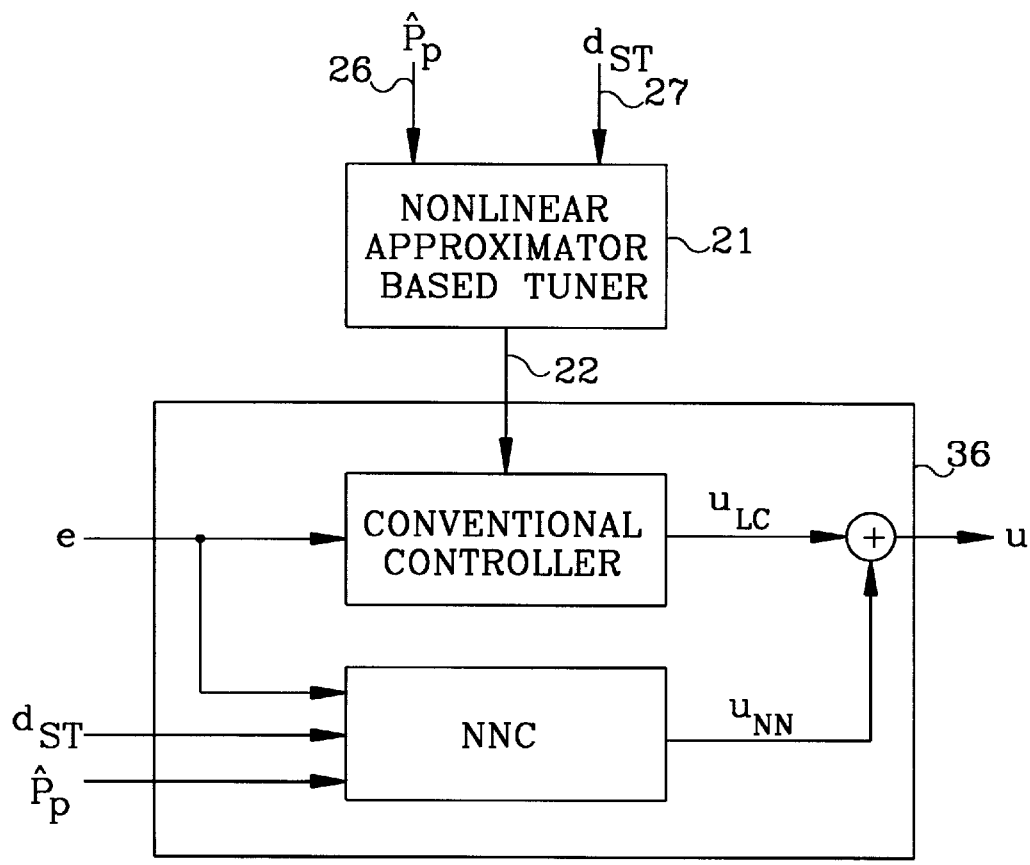
FIG. 11 shows a neural network tuner used in conjunction with a parametrized neurocontroller.

Tuner 21 can be used in control structure having both linear and nonlinear components. For example, tuner 21 can be used in conjunction with a parametrized neurocontroller 36, as shown in FIG. 11.

Neural network based automatic tuner 21 is optimized off line using a design framework. An "evolutionary computing" algorithm has been developed that incorporates aspects of genetic algorithms. Also, a gradient search can be enabled, with gradients numerically computed.

The flexible nature of the design framework permits one to optimize for criteria that more conventional approaches seldom permit. In particular, performance criteria need not be quadratic, or even differentiable; control structures can be arbitrarily nonlinear; and robustness can explicitly be considered. The present approach to the optimization of neural network based automatic tuner 21 does not require "learning in advance" in which input-output combinations must be first compiled using a separator optimization program, and neural network 28 then trained using supervised learning. The present approach can thus be contrasted to the approach of Nomura et al. (U.S. Pat. No. 5,311,421) in which the use of a neural network for tuning is also disclosed but in which the development of the neural network requires a supervised learning algorithm for which appropriate teaching data must be collected.

Figure 12:
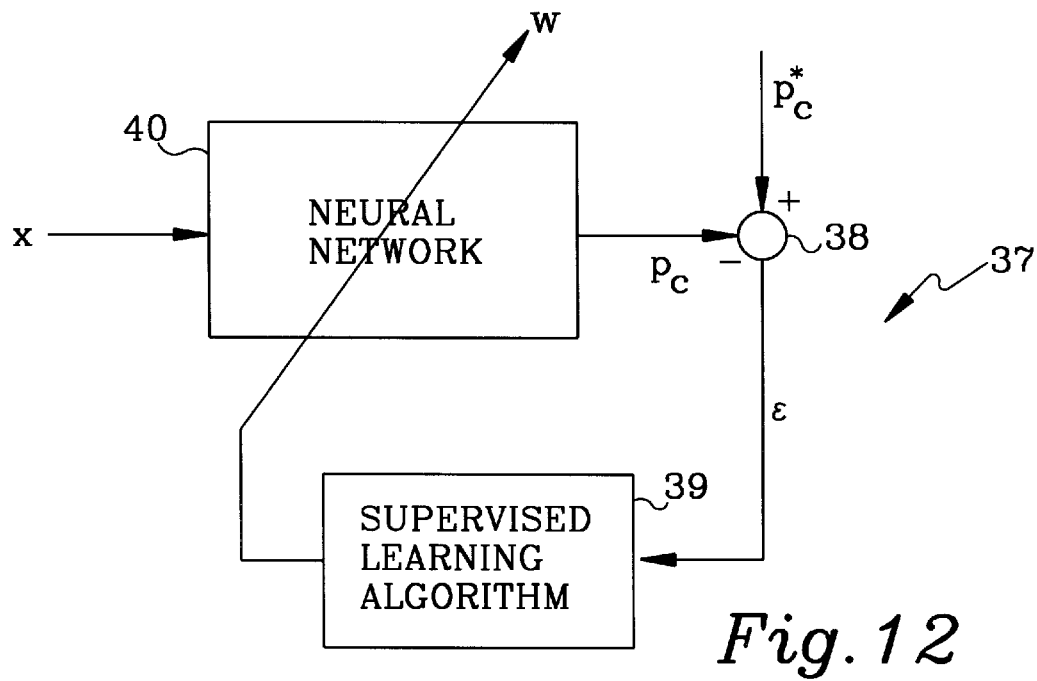
FIG. 12 illustrates a prior art neural network tuner with a supervised learning algorithm feature.

One may use supervised learning of Nomura et al. for neural network tuner 37 of FIG. 12. For tuner 37, inputs may be designated x and outputs designated $P_c$. $d_{ST}$ is part of X. $P_c$ are control parameters. $P_c$ is compared with the desired output $P_c^*$ and the result of the comparison at comparator junction 38 is error ε, which is fed to learning algorithm 39. Algorithm 39 then provides an output to neural network 40 to adjust the weights for output adjustments. For that supervised learning, a large database of (x, $P_c^*$) pairs need to be compiled in advance. $P_c^*$ needs to be computed for many different cases in advance. Nomura et al. involves the inputting of information with the characteristics contained therein to a neural network 40 for "learning in advance a correlation" between the information containing the characteristics and a control parameter and determining a control parameter for a controller. "Learning in advance" means the determining of optimal control parameters corresponding to different characteristics of the model of the combined controller-controlled system and then using the optimal control parameters as learning teacher data. In Nomura et al., it is also assumed that input-output combinations are available as learning data (col. 11, lines 11–17). The $C_j$'s in equation (10) are ideal outputs that the neural network is trained to match, and thus $C_j$'s are to be available for neural network training. The neural network is used as a nonlinear regression model and thus the neural network is regressed using input-output training data.

The present approach does not rely on such supervised learning. No collection of (x, $P_c^*$) pairs is needed and no computation of (optimal) $P_c^*$'s is required. The present neural network is developed using off-line optimization without any need for "learning in advance" in the sense of Nomura et al. No input-output training data is needed.

It should be noted that the prior art of Nomura et al., by virtue of its reliance on a supervised learning approach, is restricted to certain types of neural network tuners. Our invention eschews supervised learning entirely in favor of a simulation-based optimization approach, and an important ancillary benefit of this approach is that the tuner can comprise arbitrary nonlinear approximators, including but certainly not limited to the type of neural network structure employed in the cited prior art.

Figure 13:
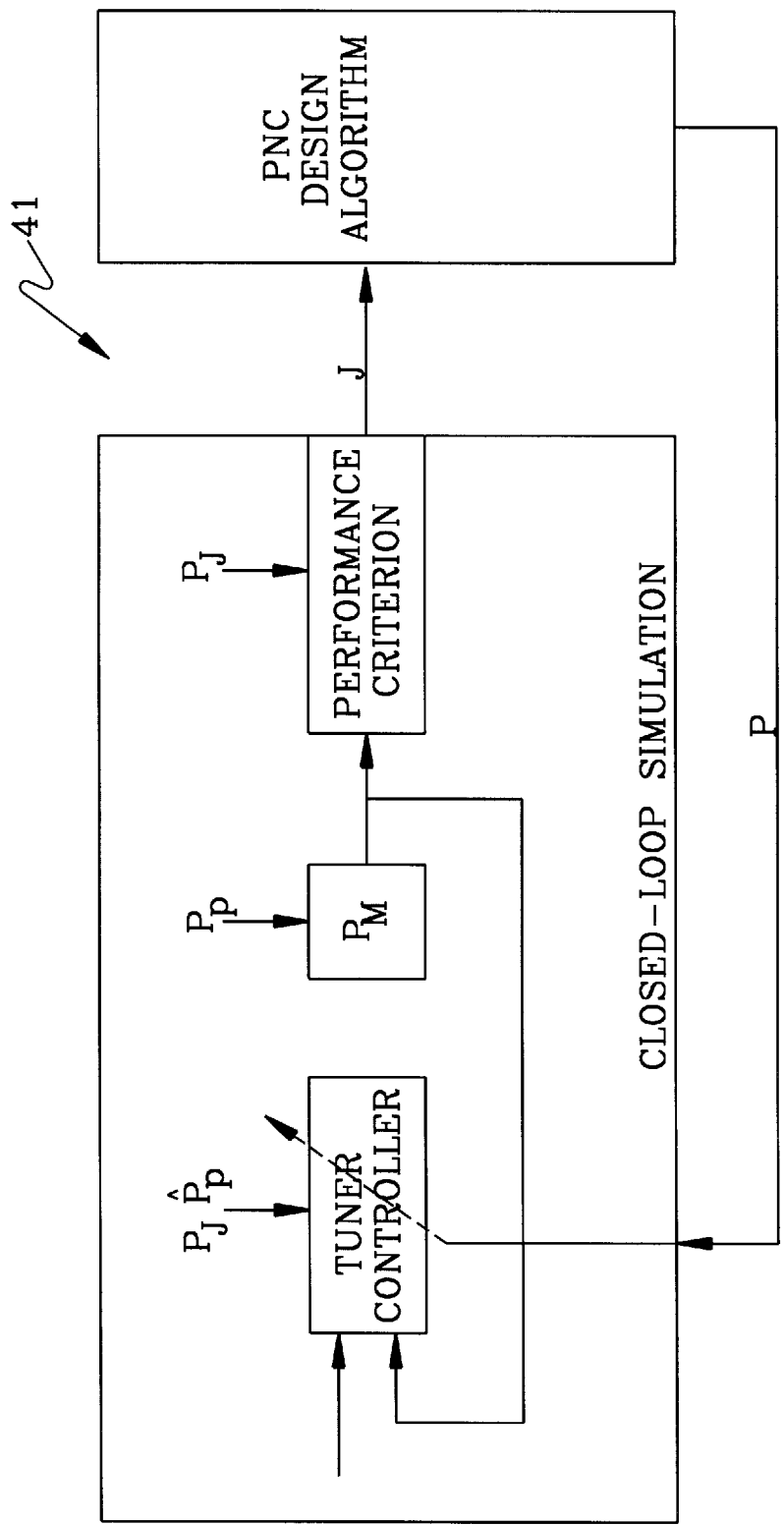
FIG. 13 is a schematic of one framework of the present invention, not relying on supervised learning.

FIG. 13 shows the design framework 41 of the present invention schematically. For each parameter vector p, closed-loop simulations are run and a performance criterion value computed. No learning teacher data is required. The vector p can contain gains for a linear control structure, so that one can optimize a fixed controller for some criterion; it can contain parameters for a nonlinear-approximator-based tuner or neural network controller (e.g., parametrized neurocontroller (PNC) 36 in FIG. 11); or it can contain parameters for both the tuner and controller, so that both modules can simultaneously be optimized. The objective of the design activity is to develop tuners or controllers that can be used for a broad range of applications. Thus, numerous closed-loop simulations must be run for every choice of p. In these simulations, various parameters are varied depending on the design requirements:

Process model parameters $p_p$ which are input to the process model (PM) in the closed-loop simulation Estimation errors between these process model parameters and the process model parameter estimates $\hat{p}_p$, of which the latter are input to the tuner and/or controller Initial conditions, especially in the case that the closed-loop controller or process model is nonlinear Setpoint profiles, also for nonlinear controllers or nonlinear process models Parameters $p_J$ that affect the cost function-the use of these parameters allow us to develop one control solution for a class of parametrized criteria Each closed-loop simulation results in one elementary cost function $J_i$ being computed. The results of all the simulations conducted for one vector p are composed into an overall cost function J which is returned to the optimization algorithm:

$$J = f_J(J_1, J_2, \ldots, J_N)$$

where N is the number of closed-loop simulations performed (typically 1000).

The above paragraphs describe the general framework of the design system. For this project, one has made specific choices for optimization runs. Note these below:

Process models are first order with dead time. The process gain $K_p$ is normalized to 1.0, the process time constant $T_p$ to 10.0. The process dead time $T_d$ varies so that the constraint in the next statement holds:

Estimates of $K_p$, $T_p$, and $T_d$ are input to the neural network controller or tuner. These estimates are perturbations of the true model parameters as discussed below. $\hat{T}_d$ is limited to the range $[0, 2\hat{T}_p]$.

The parameter estimate for a parameter $p_i$ is bounded uniformly within $[(1-r)p_i, (1+r)p_i]$, where r is a parameter. r is a function of the criterion parameter $d_{ST}$ which can vary between 0 and 1. This function is a linear function so that the minimum value of r, achieved when $d_{ST}$ is 0, is $r_{min}$; and the maximum value, corresponding to $d_{ST}$ equal to 1, is $r_{max}$. Thus, $d_{ST}$ controls the robustness of the control, in addition to being a settling time knob as discussed below.

The only criterion parameter employed is $d_{ST}$. The elementary criterion is:

$$J_i = a_0 d_{ST} t_{ST}^s + a_1(1 - d_{ST})y_{os}^s + a_2(\Sigma \Delta u^2)^s$$

Here $t_{ST}^s$ is the scaled settling time for the simulation, $y_{os}^s$ is the scaled maximum fractional overshoot relative to the setpoint change, and $(\Sigma \Delta u^2)^s$ is the scaled sum of control moves over the simulation period. $d_{ST}$, $t_{ST}^s$, $y_{os}^s$ and $\Delta u$ all of course vary with each closed-loop simulation, but for clarity one has not explicitly indicated the dependence on case i in this equation. The weighting factors used for most experiments are $a_0$: 0.75, $a_1$: 0.2, $a_2$: 0.05.

The overall cost function J is simply the sum of the individual $J_i$'s:

$$J = \sum_i J_i$$

The scaled settling time $t_{ST}^s$ is based on the computed settling time $t_{ST}$ as follows. First, the maximum and minimum expected values are computed for $t_{ST}$:

$$t_{ST}^{max} = A_{Tp}^{max} T_p + A_{Td}^{max} T_d$$
$$t_{ST}^{min} = A_{Tp}^{min} T_p + A_{Td}^{min} T_d$$

and then $t_{ST}^s$ is linearly scaled within these limits, and bounded outside:

$$t_{ST}^s = \begin{cases} 1.0 & \text{if } t_{ST} \geq t_{ST}^{max} \\ 0.0 & \text{if } t_{ST} \leq t_{ST}^{min} \\ \dfrac{t_{ST} - t_{ST}^{min}}{t_{ST}^{max} - t_{ST}^{min}} & \text{otherwise} \end{cases}$$

A similar approach is followed for calculating $y_{os}^s$ from $y_{os}$. A fractional overshoot of 0.0 (i.e., no overshoot) maps to a $y_{os}^s$ value of 0.0, and a fractional overshoot of 20 percent or more (relative to the setpoint change) maps to 1.0, with the scaling in between again being linear. For the squared sum of control moves, these bounds are 1.0 and 3.0.

The above has specified in some detail how the optimization algorithm evaluates a parameter vector. This scheme has been followed for neural network tuner designs for different controllers. Parameter choices for two types of controllers—PI/PID and "higher order linear controllers" (HOLC) are shown below:

| Design Parameter | PID/PI Tuner | HOLC Tuner |
|---|---|---|
| $r_{min}$ | 0 | 0 |
| $r_{max}$ | 0.25 | 0.5 |
| $A_{Tp}^{min}$ | 0.2 | 0.1 |
| $A_{Tp}^{max}$ | 2.0 | 2.0 |
| $A_{Td}^{min}$ | 2.0 | 1.0 |
| $A_{Td}^{max}$ | 8.0 | 6.0 |

Thus, both the PID/PI tuner and the HOLC tuner are designed to allow robustness/performance tradeoffs to be done by simply adjusting one knob ($d_{ST}$).

An outline of the evolutionary computing algorithm used for the design of the neural network tuners (the parameter vector is notated as w rather than p) is provided:

1. Generate an initial set or population of vectors $w_1, \ldots, w_N$ and evaluate cost function values $J_i = J(w_i)$.

Compute $J_{max} = {}^{max}_i J_i$, $w_{max} = {}^{argmax}_i J_i$.

2. Select a parameter vector w' at random (uniform distribution) from population
3. Select the perturbation standard deviation $\sigma_w$ randomly from between specified lower and upper bounds, $\sigma_w^{min}$ and $\sigma_w^{max}$
4. Generate a perturbation vector $\delta_w \sim N(0, \sigma_w^2)$
5. Generate a parameter vector w"←w'+$\delta_w$ and evaluate J(w")
6. If J(w")≦$J_{max}$ then Replace $w_{max}$ with w' Set w' to w" Recompute $J_{max}$ and $w_{max}$ Goto Step 5 {Reapply perturbation}
7. Goto Step 2

Figure 14A:
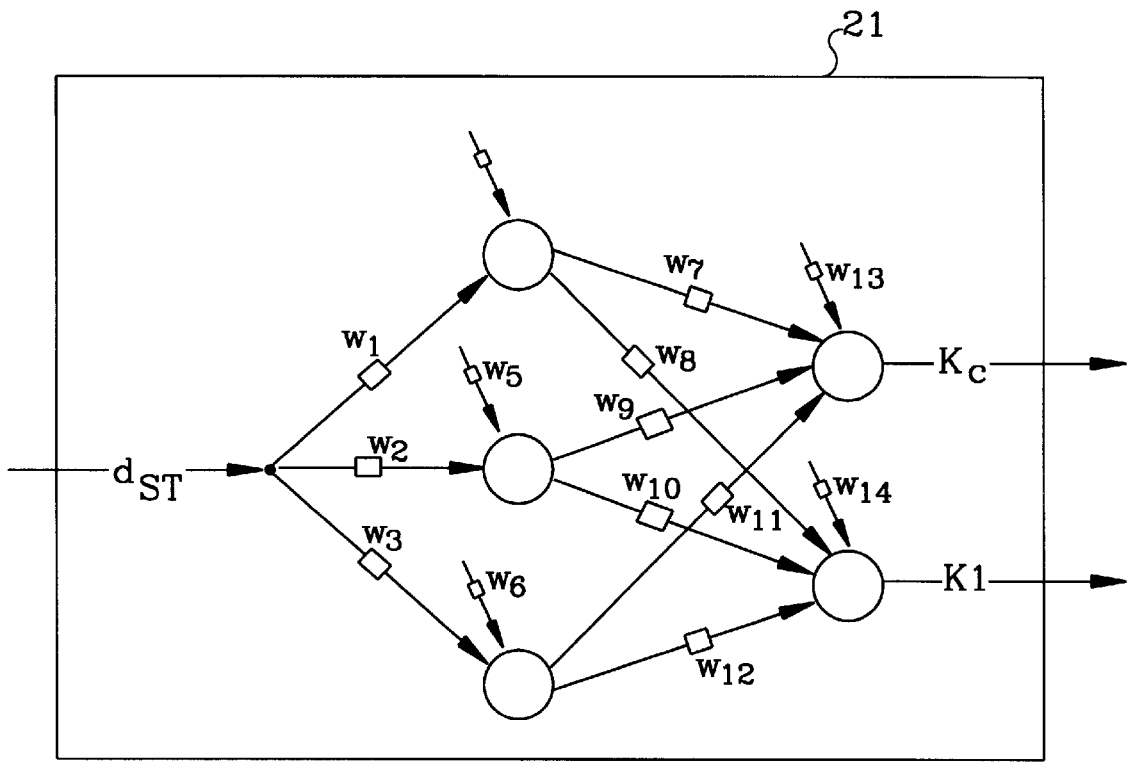
FIG. 14a shows an example of a tuner for a proportional-integral (PI) controller embodied as a neural network with one tuning knob input and outputs for proportional and integral gains.
Figure 14B:
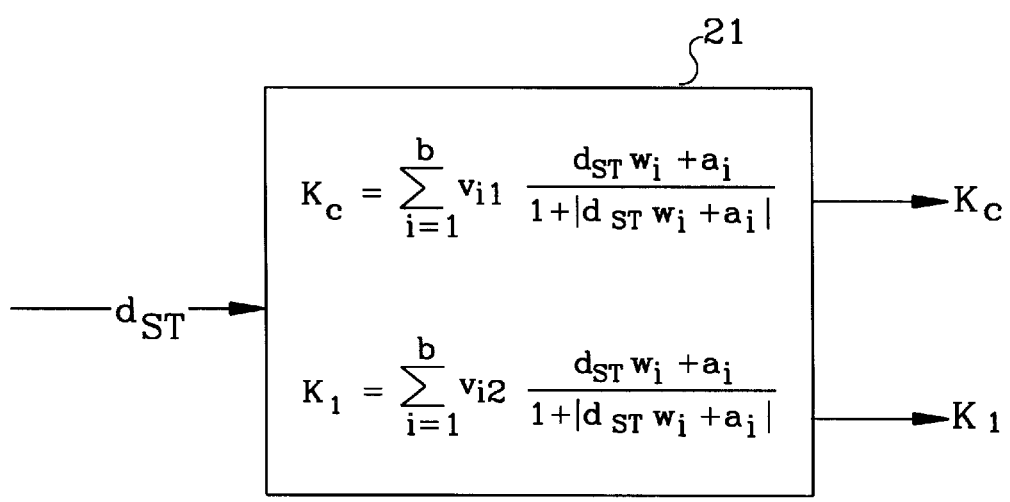
FIG. 14b shows a tuner embodied as a computationally simple compositional mapping with one tuning.

According to the present invention, one can design a tuner by employing a nonlinear optimization algorithm in conjunction with a closed-loop simulation system. The nonlinear optimization algorithm attempts to minimize the value of the cost function J(p) by appropriately adjusting the nonlinear approximator parameters p. FIGS. 14a and 14b show two similar nonlinear-approximator-based tuners 21. In FIG. 14a, the nonlinear approximator is implemented as a multilayer perceptron neural network. The parameters to be optimized in this case are $w_1, \ldots, w_{14}$. In FIG. 14b, the nonlinear approximator is implemented as a computationally simple compositional mapping—the figure shows the mathematical formulation of the mapping. Because of its computational simplicity, this is a preferred embodiment. The parameters to be optimized in this case are $w_1, w_2, \ldots, w_b, a_1, a_2, \ldots, a_b, v_{11}, v_{21}, \ldots, v_{b1}, v_{12}, v_{22}, \ldots, v_{b2}$. It should be noted that the implementations of FIGS. 14a and 14b have very similar features, and in both cases output $K_C$ and $K_I$ as functions of $d_{ST}$ and the respective parameters. However, the supervised learning algorithm described in Nomura et al. cannot directly be used for the approximator of FIG. 14b. Once the appropriate parameters are determined so as to minimize J(p), tuner 21 can be applied to real systems (provided that the constraints assumed in the design hold for the real system).

Figure 15:
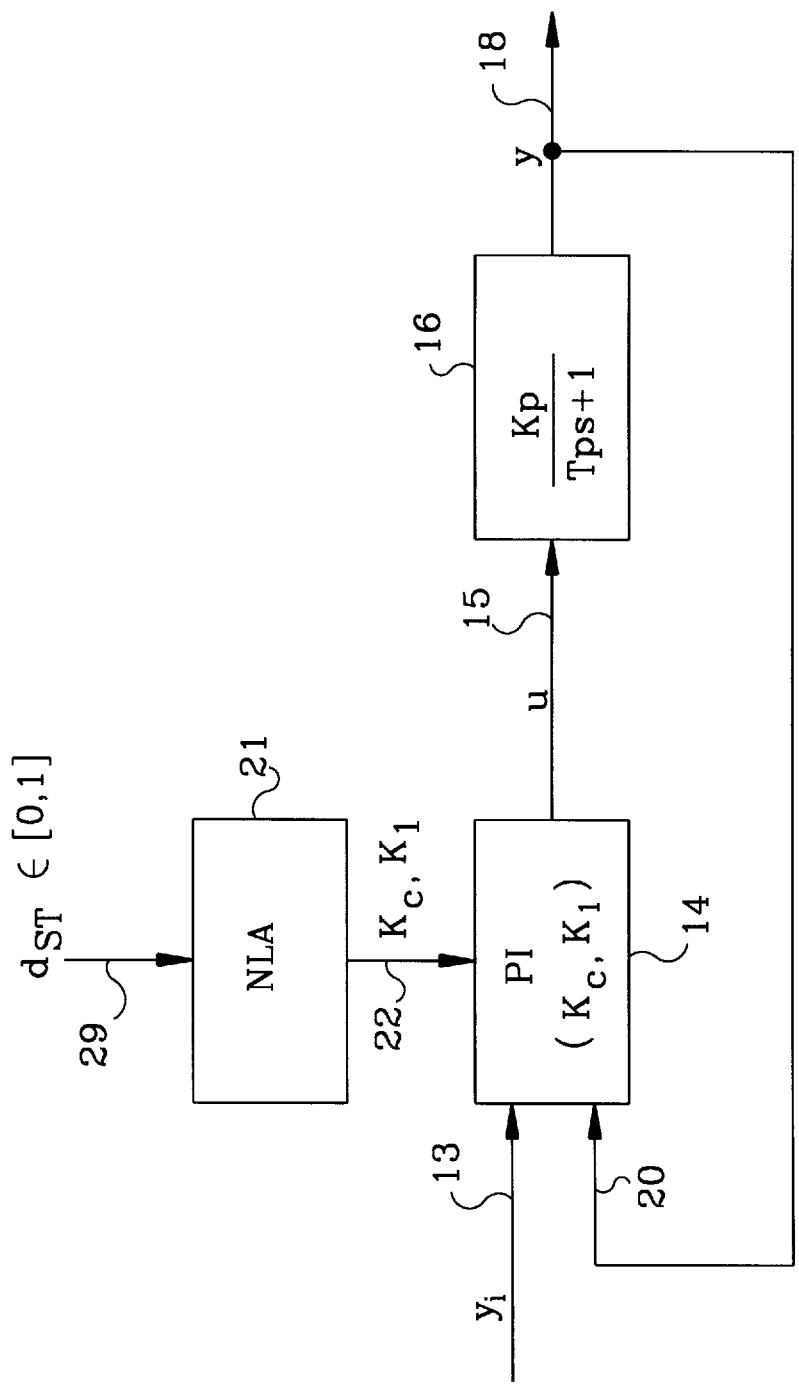
FIG. 15 shows how the tuner of FIG. 14 can be used for a known linear first-order process.

The optimization involved in tuner design may seem complex and time consuming. However, once designed, tuner 21 can be easily used in a variety of different applications on simple computational platforms. FIG. 15 shows how tuner 21 is used for system control. Tuners can be designed and used in different embodiments, depending on the nature of user-control of closed-loop performance desired, and the types of systems and controllers the tuner will be used with.

Figure 16:
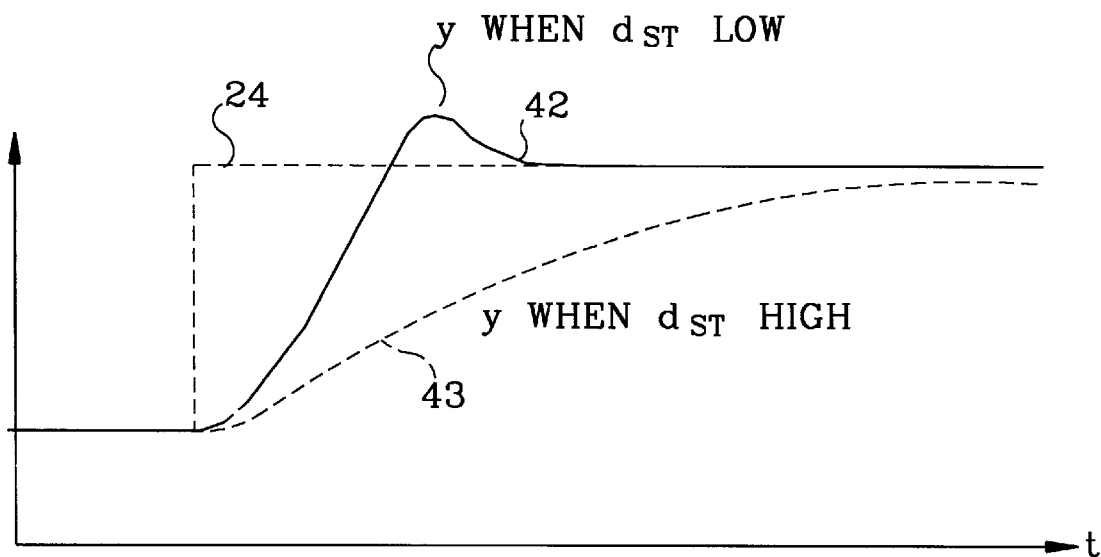
FIG. 16 is a graph for slow or fast settling, dependent upon tuner adjustment input.
Figure 17:
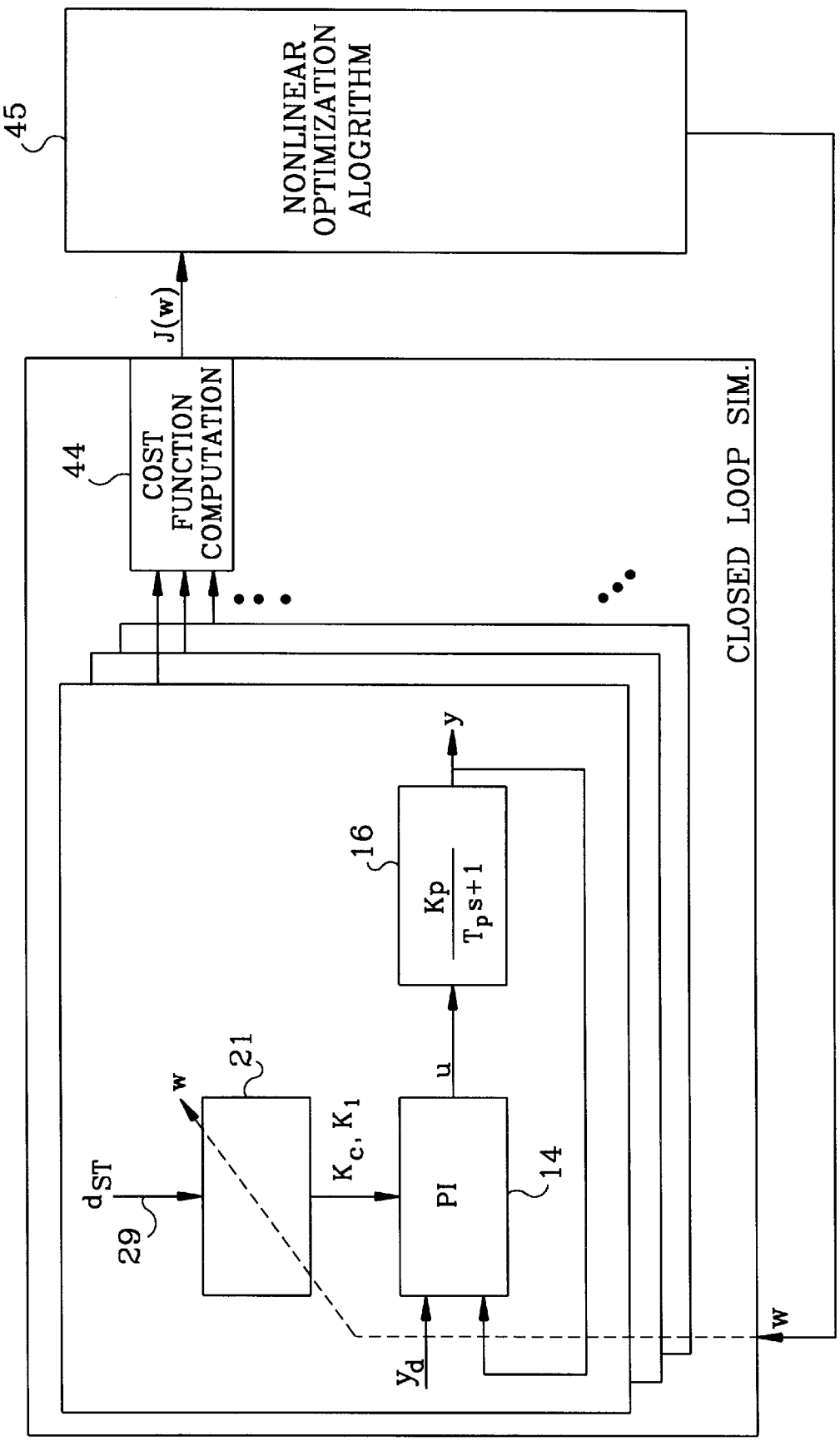
FIG. 17 is a schematic for developing the tuner of FIG. 15 using a nonlinear optimization algorithm.

In one example embodiment of a fixed first order linear process, PI controller, for settling time tuning, one can describe how this invention can be applied to design a nonlinear-approximator-based tuner 21 for PI controller 14 with a "settling time" tuning knob 29 when the processes for which tuner 21 is designed are assumed to be adequately characterized by first-order linear dynamics which are accurately known. A system is illustrated in FIG. 15. The process model is expressed in the Laplace domain as:

$$Y(s) = \frac{K_p}{T_p s + 1} U(s) \Rightarrow \frac{dy}{dt} = -\frac{1}{T_p} y(t) + \frac{K_p}{T_p} u(t)$$

where $K_p$ is the process gain and $T_p$ the time constant, the values for which are known (through experiments or process knowledge). Tuner 21 has one tuning knob 29, $d_{st}$, which can be varied over a range 0.0 to 1.0 to make the process response to a setpoint change be fast or slow. For fast settling, one is relatively tolerant of overshoot in the response, and control action. For slow settling, however, one wants overshoot to be minimized and control action not to be aggressive. FIG. 16 shows curve 42 of y when $d_{st}$ is low and curve 43 when $d_{st}$ is high for setpoint change 24. A possible cost function 44 (FIG. 17) for this embodiment is the following:

$$J(w) = \frac{E}{d_{st} \in [0,1]} ((1-d_{st})f_{st}(t_{st}) + d_{st}f_{os}(y_{os}) + d_{st}f_{um}(\Delta u_{max})) \quad (1)$$

In this expression, E(•) denotes the expectation operator, and $d_{st} \in [0,1]$ denotes that the expectation is to be taken over a (uniformly distributed) range from 0 to 1 of values of $d_{st}$. $t_{st}$ represents the settling time of the closed-loop simulation, $y_{os}$ the overshoot in the response, and $\Delta u_{max}$ the maximum control move encountered. The functions $f_{st}(.)$, $f_{os}(.)$, and $f_{um}(.)$ are scaling functions so that the effect of the three terms is in accordance with the relative importance of each of these features. Note that since $d_{st}$ is an input to tuner 21 which outputs PI gains that influence the closed-loop behavior (and hence $y_{os}$, $t_{st}$, and $\Delta u_{max}$), the value of the expression (1) is a function of parameters p of the nonlinear approximator.

Once a tuner 21 is designed to minimize J(w) in equation (1), it can directly be used to control the target process. The control performance can be adjusted through the use of the tuning knob $d_{st}$ 29. When $d_{st}$ is low (near 0), setpoint changes will be rapidly tracked. When $d_{st}$ is high (near 1), fast setpoint tracking is no longer important, but output overshoot and the maximum actuator move will be minimized. Of course, since tuner design 21 is based on a specific process model, the tuner performance will largely be dependent on the accuracy of the model. For cases where the model is not precisely known, tuners can be optimized for robust performance.

Equation (1) cannot be analytically solved in most cases of practical interest. However, it can be approximated by Monte Carlo simulations to as high a degree of accuracy as required. This simulation approximation is guided by a nonlinear optimization algorithm 45 of FIG. 17. Of course, high precision is gained at the expense of computing time.

For the embodiment of an uncertain first order with delay linear process, PID controller, settling time tuning, one no longer assumes that the process is precisely known. Instead, tuner 21 is designed to optimize performance over a range of process models. One extends the process model of the embodiment of a fixed first order linear process and PI controller, by adding a delay or dead-time:

$$\frac{K_p e^{-T_d}}{T_p s + 1}$$

where $T_d$ is the process dead time. The three process parameters are assumed to lie within known spaces K (for Kp), T (for Tp), and Θ (for Td). In addition, one is now interested in a tuner for a PID controller in interactive form. The controller transfer function is:

$$u(s) = K_c \left(1 + \frac{1}{T_i s}\right) \left(\frac{1 + \tau_d s}{1 + \alpha \tau_d s}\right) E(s)$$

where U(s) is the controller output (Laplace transformed), $T_i$ is the integral time, $\tau_d$ the derivative time, α the rate amplitude (a known constant), and E(s) the error (Laplace transformed).

In this case, one can adopt the following cost function:

$$J(w) = \max_{\substack{d_{st} \in [0,1] \\ K_p \in K \\ T_p \in T \\ T_d \in \Theta}} ((l - d_{st})f_{st}(t_{st}) + d_{st}f_{os}(y_{os}) + d_{st}f_{um}(\Delta u_{max})) \quad (2)$$

Here, instead of minimizing an expectation, one is interested in minimizing the worst case performance. The maximum is computed over spaces for $d_{st}$, $K_p$, $T_p$, and $T_d$. The robustness associated with a tuner that is optimized for Cost Function (2) implies a loss of nominal performance. If in fact the process model parameter estimates were known more precisely than one assumes here, then better control could be achieved. This suggests that a tuning knob could be added that allows the user of the tuner to make the robustness versus nominal performance tradeoff on a case-by-case basis without reoptimization. The next embodiment description discusses this aspect of the invention.

In an embodiment of an uncertain first order linear process, multiple lead-lag controller, for settling time and robustness tuning, the controller is not of the PID variety but consists of three lead lag terms:

$$U(s) = \frac{a_0 (a_1s + 1)(a_2s + 1)(a_3s + 1)}{(b_1s + 1)(b_2s + 1)(b_3s + 1)} E(s)$$

A second tuning knob, r, is added that also varies between 0 and 1. The parameter spaces over which tuner 21 operates are now a function of r:

$$J(w) = \max_{\substack{d_{st} \in [0,1] \\ r \in [0,1] \\ K_p \in K(r) \\ T_p \in T(r)}} ((l - d_{st})f_{st}(t_{st}) + d_{st}f_{os}(y_{os}) + d_{st}f_{um}(\Delta u_{max})) \quad (3)$$

For simplicity, one may revert to the simple delay-less process model.

For r=0, the expectation is evaluated over small spaces K and T in this case, and one is interested in maximizing performance at the expense of robustness. As r is increased, the ranges increase in accordance with prespecified functions K(r) and T(r). Note that the effect of r can be incorporated into $d_{st}$ itself-the slower settling times associated with high $d_{st}$ values are consistent with increased robustness. Thus, Cost Function (3) could be simplified by removing r and making K and T dependent on $d_{st}$.

In the embodiments discussed so far, tuner 21 input has not included any information on process 16 itself. The tuners can be used for different processes to the extent that they fall within the robustness spaces K, T, and $\Theta$ above. The next two embodiments are described in which the tuner is also provided process parameter estimates as inputs, and is thereby generically applicable to a considerably larger space of processes. For the first embodiment, the generic feature is obtained simply by scaling controller gains.

In a process-generic tuner, first order process model, one may assume the design conditions of the embodiment of a first order linear process with a PI controller, and let the tuner be designed for specific nominal values of $K_p$ and $T_p$. Let these values be $K_p^{nom}$ and $T_p^{nom}$, respectively. For a given setting of $d_{st}$, let the gains output by the tuner be $K_c^{nom}$ and $K_i^{nom}$. The same tuner outputs can be used for a different process (one that permits a first order approximation) with a gain of $K_p^{new}$ and a time constant of $T_p^{new}$ by adapting the gains as follows:

$$K_c^{new} = \frac{K_c^{nom} K_p^{nom}}{K_p^{new}}$$

$$T_i^{new} = \frac{T_i^{nom} T_p^{new}}{T_p^{nom}}$$

Scaling formulae can be derived for all cases where both the controller and the process model are linear. Similar formulae can also be derived for some cases where the controller is nonlinear and the process model is linear. Such scaling formulae can compensate for arbitrary $K_p$ and $T_p$ values. In cases where the process model contains additional parameters, the nominal values above need to be functions of model parameters.

One may extend the embodiment of the process-generic tuner, first order process model, by adding a delay (dead time) to the process model. To design a tuner that will work for all processes that can be modeled as a first-order linear system with delay, provided that the delay does not exceed some constant factor $\beta$ of the time constant $T_p$, one can provide a process model input to the tuner. This input is $$T_r = \frac{T_d}{T_p}.$$

The design cost function (1) is now extended as:

$$J(w) = \max_{\substack{d_{st} \in [0,1] \\ T_r \in [0,\beta]}} ((l - d_{st})f_{st}(t_{st}) + d_{st}f_{os}(y_{os}) + d_{st}f_{um}(\Delta u_{max})) \quad (4)$$

So the tuner design is performed for fixed values of $K_p$ and $T_p$ and with $T_d$ varying between 0 and $\beta T_p$. Once the design is complete-a weight vector w is determined that minimizes Cost Function (4)-the resulting tuner can then be used for any process that can be modeled as first order with dead time, the only constraint imposed being that the dead time is no greater than $\beta$ times the process time constant. For such use, estimated values of process gain, time constant, and dead time need to be input to the tuner. These are used to compute Tr and also to effect scalings such as those defined above. Since Cost Function (4) does not address robustness, these parameters must be accurately known.

In a state feedback controller, having a nonlinear process model and input disturbance rejection tuning, one assumes that the process is nonlinear, with model structure known:

$$\begin{pmatrix} x_1(t+1) \\ x_2(t+1) \\ x_3(t+1) \end{pmatrix} = \begin{pmatrix} 2x_1(t)x_2(t) + x_1^2(t) \\ x_1(t) + x_3(t) \\ \sin(\pi x_2(t)) \end{pmatrix} + \begin{pmatrix} 0 \\ 0 \\ \gamma \end{pmatrix} u(t) \quad (5)$$

$$y(t) = x_1(t)$$

In this model, the $x_i$ are state variables and $\gamma$ is a parameter. For a control structure, one adopts a linear state-feedback control law:

$$u(t) = a_1 \Delta x_1(t) + a_2 \Delta x_2(t) + a_3 \Delta x_3(t)$$

where $\Delta x_i = x_i^{(d)} - x_i$, the difference between the desired state value and the measured value. Thus, the tuning problem in this case is to estimate appropriate values of the controller parameters a1, a2, and a3. This is to be done on the basis of two knobs: One is a performance criterion setting $d_{dr}$ that allows the user to tradeoff control action versus fast disturbance rejection for step input disturbances. The other is an estimate $\hat{\gamma}$ of the model parameter $\gamma$. By incorporating this latter parameter, one allows the same controller and tuner to be used over a range of processes of structure similar to equation (5) without being limited to process models with γ equal to some specific nominal value. The fact that we use an estimate of γ instead of the actual value implies that the tunings will have designed-in robustness to errors in parameter estimation. A suitable cost function for this embodiment is the following:

$$J(w) = \hat{\underset{\gamma \in [\gamma - \delta(d_{dr}), \gamma + \delta(d_{dr})]}{\underset{\gamma \in [1, 5]}{\underset{d_{dr} \in [0, 1]}{E}}}}_{\underset{x(0) \in X_0}{d \in [-d_{max}, d_{max}]}} ((l - d_{dr})f_{dr}(t_{dr}) + d_{dr}f_{su}(\Sigma(\Delta u))) \quad (6)$$

Values of γ for which this tuner is designed, range from 1 to 5. The estimation error for tuning input purposes is up to ±δ, and is a function of $d_{dr}$ so that greater robustness is demanded for slow rejection time. The step input disturbances d that one is interested in rejecting have amplitudes between $-d_{max}$ and $d_{max}$. $t_{dr}$ is the time to reject the input disturbance and Σ(Δu) is the sum-squared control action. The expectation must also be computed over a space $X_0$ of initial conditions x(0).

For the embodiment of a state feedback controller having a nonlinear process model and input disturbance tuning as above, one can also employ a nonlinear controller of known structure, for example:

$$u(t)=a_1x_1(t)+a_2x_2(t)+a_3x_3(t)+a_4x_1(t)+a_5x_1^2(t)$$

$$x_3(t)+a_6x_2(t)x_3(t)$$

In this embodiment the tuner outputs six parameters $a_1-a_6$. Cost Function (6) can again be used.

For a PD controller, integrating linear process, easy-to-compute response feature inputs, rise time tuning, the following may be implemented.

The process model is:

$$Y(s) = \frac{K_p}{s(T_p s + 1)} U(s)$$

The controller is:

$$u(t) = K_c e(t) + K_d \frac{e(t) - e(t - \Delta t)}{\Delta t}$$

Tuner outputs are proportional gain $K_c$ and derivative gain $K_d$. The tuner input consists of simple features computed from the process output after exciting the process at time $t_0$ with a pulse of height H and width W. The process output is measured at times $t_0+nW/4$, for n=0, 1, . . . , 10. Ten features are computed simply as $y(t_0+nW/4)-y(t_0)$ for n=1, 2, . . . , 10. Neither Tp nor Kp are assumed to be known in this embodiment. However, appropriate values for H and W do depend on the process, and some general notions of the time constant and gain are needed.

In all the above embodiments, the key piece of the tuner is a nonlinear approximator. Various nonlinear approximators can be used in this context, including multilayer perceptron neural networks, computationally simple sigmoidal compositions, radial basis function networks, functional link networks, CMAC networks, fuzzy logic models that employ fuzzification and/or defuzzification and/or membership functions, wavelet networks, polynomial expansions, and specific nonlinear parametrized structures.

I claim:

1. A tuner for producing internal gain parameters of a controller, comprising:
   preprocessing means, having an input and an output, for processing a set of parameters at the input into a set of transformed parameters at the output;
   nonlinear approximator means, having an input connected to the output of said preprocessing means and having an output, for operating on the set of transformed parameters to produce a set of normalized controller tuning parameters at the output wherein said nonlinear approximator means is offline optimized in model based simulation without advance supervised learning; and
   postprocessing means, having a first input connected to the output of said nonlinear approximator means, and having a second input and an output, for scaling the set of normalized controller tuning parameters into a set of scaled controller tuning parameters at the output, wherein the scaled controller tuning parameters are fed to the controller for optimally controlling a process.

2. The tuner of claim 1 wherein said nonlinear approximator means is a neural network.

3. The tuner of claim 1 wherein said nonlinear approximator means is a fuzzy approximator.

4. The tuner of claim 1 wherein said nonlinear approximator means is a radial basis function approximator.

5. The tuner of claim 1 wherein said nonlinear approximator means is an approximator that utilizes nontranscendental mathematical functions.

6. The tuner of claim 1 wherein said nonlinear approximator means is an approximator that utilizes computationally simple compositional sigmoidal mappings.

7. A tuner for producing internal gain parameters of a controller, comprising:
   preprocessing means, having an input and an output, for transforming a set of input parameters at the input into a set of normalized parameters at the output,
   nonlinear approximator means, having an input connected to the output of said preprocessing means and having an output, for algorithmically operating on the set of normalized parameters in that said nonlinear approximator means is setup offline using a system that integrates closed-loop simulations with an optimization algorithm that optimizes parameters of said nonlinear approximator means to minimize a cost function that indicates performance of the closed-loop simulations to result in a set of normalized tuning parameters at the output; and
   postprocessing means, having a first input connected to the output of said nonlinear approximator means, having a second input connected to the input of the preprocessing means and having an output, for scaling the set of normalized tuning parameters into controller tuning parameters at the output.

8. The tuner of claim 7 wherein:
   the input parameters are either or both of two types of parameters, wherein the two types of parameters are:
   parameters characterizing a system to be controlled; and
   parameters characterizing a desired closed-loop behavior; and
   said nonlinear approximator means is optimized offline without supervised learning and wherein the offline optimization does not require generation of optimized tuning parameters for optimizing said nonlinear approximator means.

9. The tuner of claim 8 wherein said nonlinear approximator means is a neural network.

10. The tuner of claim 8 wherein said nonlinear approximator means is a fuzzy approximator.

11. The tuner of claim 8 wherein said nonlinear approximator means is a radial basis function approximator.

12. The tuner of claim 8 wherein said nonlinear approximator means is an approximator that utilizes nontranscendental mathematical functions.

13. The tuner of claim 8 wherein said nonlinear approximator means is an approximator that utilizes computationally simple compositional sigmoidal mappings.

14. A system for setting up a tuner comprising:

a tuner having inputs;

approximator parameters;

controller parameters;

a closed-loop control simulator;

a cost function; and an optimization algorithm; and wherein:
the tuner includes a nonlinear approximator, the behavior of which can be modified by adjusting the approximator parameters;
the tuner outputs controller parameters which are used in simulations with the closed loop control simulator;
a value of the cost function is computed from closed loop control simulations;
the value of the cost function is input to the optimization algorithm which optimizes approximator parameters;
optimized approximator parameters minimize the value of the cost function;
a minimized value of the cost function leads to appropriate controller parameters; and
appropriate controller parameters result in optimized controller performance.

15. The system of claim 14 wherein the nonlinear approximator is a neural network.

16. The system of claim 14 wherein the nonlinear approximator is a fuzzy approximator.

17. The system of claim 14 wherein the nonlinear approximator is a radial basis function approximator.

18. The system of claim 14 wherein the nonlinear approximator is an approximator that utilizes nontranscendental mathematical functions.

19. The tuner of claim 14 wherein the nonlinear approximator is an approximator that utilizes computationally simple compositional sigmoidal mappings.

20. A tuner for producing internal gain parameters of a controller, comprising:

preprocessing means, having an input and an output, for processing a set of input tuning parameters that indicate desired or appropriate performance characteristics at the input into a set of transformed parameters at the output;

nonlinear approximator means, having an input connected to the output of said preprocessing means and having an output, for operating on the set of transformed parameters to produce a set of normalized tuning parameters at the output; and postprocessing means, having a first input connected to the output of said nonlinear approximator means, and having a second input and an output, for scaling the set of normalized tuning parameters into a set of scaled tuning parameters at the output, wherein the scaled tuning parameters are fed to the controller for optimally controlling a process.

21. The tuner of claim 20 wherein said nonlinear approximator means is a neural network.

22. The tuner of claim 20 wherein said nonlinear approximator means is a fuzzy approximator.

23. The tuner of claim 20 wherein said nonlinear approximator means is a radial basis function approximator.

24. The tuner of claim 20 wherein said nonlinear approximator means is an approximator that utilizes nontranscendental mathematical functions.

25. The tuner of claim 20 wherein said nonlinear approximator means is an approximator that utilizes computationally simple compositional sigmoidal mappings.

26. The tuner of claim 20 further comprising a set of input tuning parameters that indicate characteristics of open loop dynamics of a system to be controlled.

27. The tuner for producing actual values of internal gain parameters of a controller that is to be used for controlling a process, comprising:

preprocessing means, having an input and an output, for processing a set of parameters at the input into a set of transformed parameters at the output;

nonlinear approximator means, having an input connected to the output of said preprocessing means and having an output, for operating on said set of transformed parameters to produce normalized actual values of internal gain parameters of said controller; and postprocessing means having a first input connected to the output of said nonlinear approximator means, and having a second input and an output, for scaling said normalized actual values of internal gain parameters into said actual values of internal gain parameters of said controller at the output, wherein said actual values of internal gain parameters are input to the controller for optimally controlling said process.

* * * * *